United States Patent [19]

Baker

[11] Patent Number: 5,112,586
[45] Date of Patent: May 12, 1992

[54] PROCESS FOR PURIFICATION OF SYNTHESIS GAS

[75] Inventor: Daniel C. Baker, Houston, Tex.

[73] Assignee: Shell Oil Company, Houston, Tex.

[21] Appl. No.: 599,546

[22] Filed: Oct. 18, 1990

[51] Int. Cl.⁵ .................... C01B 17/16; C01B 31/20;
C01C 3/00; B01D 45/00
[52] U.S. Cl. ............................ 423/220; 423/215.5;
423/236; 423/238
[58] Field of Search ............... 423/215.5, 220, 236, 423/238

[56] References Cited

U.S. PATENT DOCUMENTS

| | | | |
|---|---|---|---|
| 2,018,863 | 10/1935 | Miller | 423/238 |
| 2,784,055 | 3/1957 | Silver | 423/238 |
| 4,075,310 | 2/1978 | Fischer | 423/238 |
| 4,087,258 | 5/1978 | Baron et al. | 423/215.5 X |
| 4,375,450 | 3/1983 | Katagiri et al. | 423/238 X |
| 4,514,375 | 4/1985 | Laufhutte | 423/238 |
| 4,624,837 | 11/1986 | Baker | 423/215.5 |

Primary Examiner—Gregory A. Heller

[57] ABSTRACT

A process for the treatment of a gas stream derived from the gasification of coal is described, the process being characterized, in one embodiment, by stripping of the wash and cooling liquid used to cool and remove $NH_3$ from the synthesis gas prior to reuse of the liquid in removal of residual solids from the product gas stream, thereby avoiding incompatibilities which may initiate or aggravate chemical precipitation, particularly that of $CaCO_3$.

3 Claims, 1 Drawing Sheet

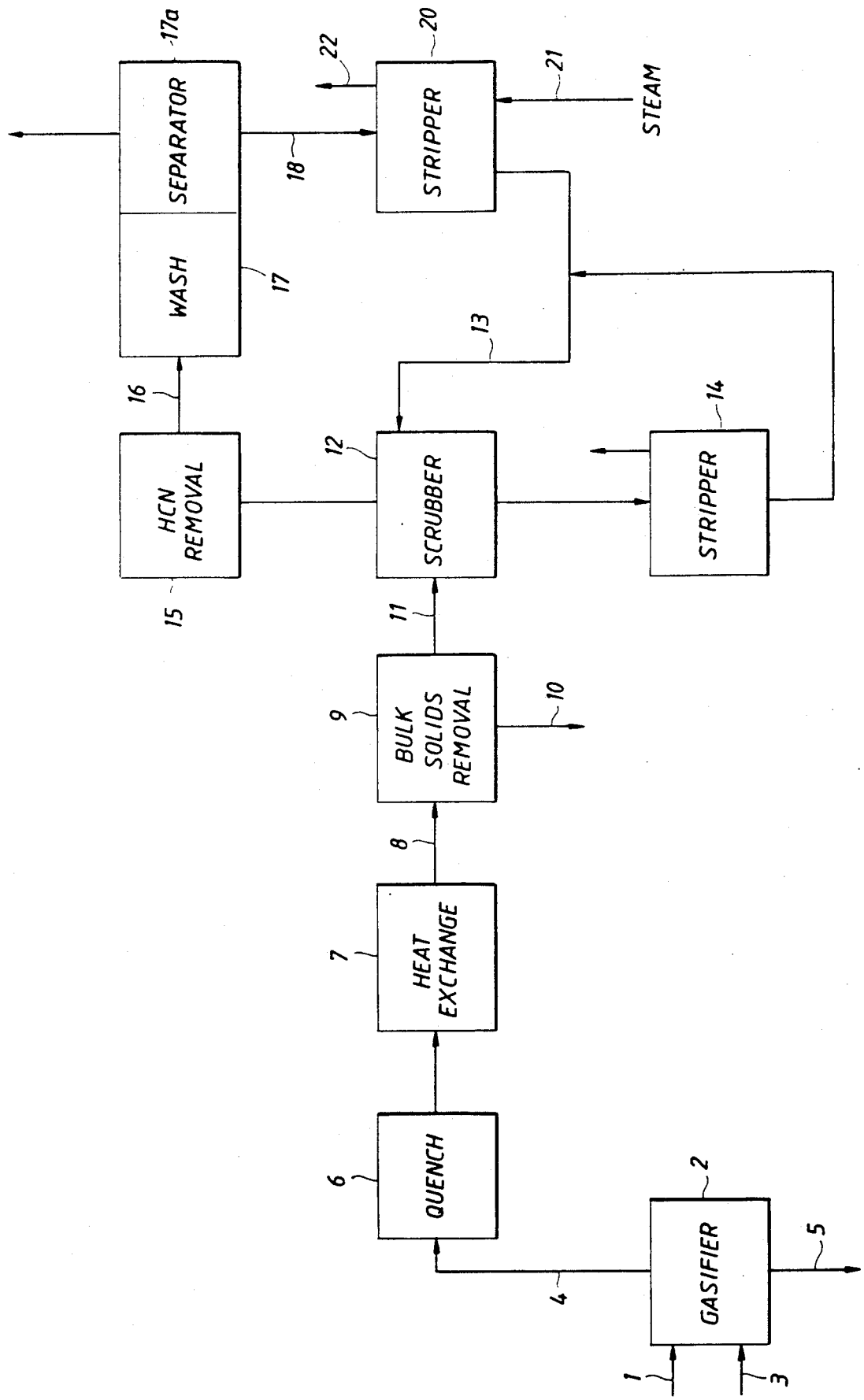

PROCESS FOR PURIFICATION OF SYNTHESIS GAS

BACKGROUND OF THE INVENTION

Partial combustion or gasification of coal involves reacting the coal at elevated temperatures and possibly elevated pressures with a limited volume of oxygen, the reaction preferably being carried out in the presence of additional agents such as steam, nitrogen, or various other materials. Gasification of coal produces a gas, known as synthesis gas, that comprises mostly carbon monoxide and hydrogen. Also produced are varying quantities of other gases, such as carbon dioxide, hydrogen sulfide, and methane, and various liquid and solid materials. The small particles of ash and carbon are commonly known and collectively defined herein as flyslag. The flyslag from processes for partial combustion of coal may contain iron, calcium, sulfur, and deposited carbon.

A principal use of the synthesis gas is as a fuel for gas turbines. However, the gas must be extensively purified before it can be used in this manner. In general, the flyslag that is entrained with the gas in partial combustion processes is usually removed from the raw synthesis gas by a combination of cyclones or separators, or a water scrubbing system employing washer coolers, venturi scrubbers, or filters or electrostatic precipitators, or combinations of these systems. In addition to the aforementioned gases, the synthesis gas also contains minor amounts of sulfur-containing gases, such as hydrogen sulfide and carbonyl sulfide, as well as small amounts of ammonia and hydrogen cyanide. The presence of HCN, $NH_3$, and COS in synthesis gas derived from the gasification of coal complicates removal of additional impurities such as $H_2S$, and poses problems insofar as product quality and pollution control requirements are concerned. Although HCN, $N_3$, and COS are present, as indicated, in quite minor quantities, for example, normally less than 1 percent by volume, combined, of the total raw synthesis gas stream, they must be dealt with before the synthesis gas is utilized.

In one such procedure, residual solids remaining after bulk removal thereof are first removed from the product gas by contacting the gas with an aqueous wash stream. The solids washed from the gas are removed from the wash zone as a thickened stream or slurry and the slurry is sent to a processing zone where the volatiles are stripped and the mixture of liquid and solids remaining is sent to disposal. The synthesis gas, now free of solids, is then sent to an HCN (and possibly COS) removal zone to remove this contaminant, such as by techniques described in U.S. Pat. No. 4,497,784 and U.S. Pat. No. 4,810,475. The synthesis gas stream may then be further cooled and washed to remove virtually all of the ammonia, and gas, now purified of minor impurity compounds, is then ready for treatment to remove $H_2S$. The wash water employed, for efficiency, may be utilized in counterflow through the process steps, winding up in the residual solids removal step.

Evidence exists that $CO_2$ in the synthesis gas may enter the wash water in the ammonia removal step and cause a buildup of calcium carbonate in the scrubbing solution utilized in the residual solids removal zone. It is believed that the $CO_2$ is dissolved in the wash water in the aqueous wash step because of the high pH that arises from ammonia removal from the synthesis gas, while the calcium enters the system as a leachable component of the residual solids that are scrubbed in the residual solids removal zone. The calcium carbonate deposits are harmful to the chemistry of the system and inhibit heat transfer in the wash zone and the zones to which the slurry is transferred. The invention addresses this problem.

SUMMARY OF THE INVENTION

Accordingly, in one embodiment, the invention comprises a process for the purification of a synthesis gas stream containing $CO_2$ and minor amounts of $NH_3$ and HCN, and from which the bulk of the flyslag has been removed but which contains residual flyslag particles, comprising (a) passing said synthesis gas stream to a solids scrubbing zone and scrubbing said gas stream with an effective amount of an aqueous scrubbing solution and removing residual flyslag particles from said stream, producing a substantially solids-free synthesis gas stream containing HCN, $CO_2$ and $NH_3$;

(b) removing HCN (and possibly COS) from said solids-free synthesis gas stream;

(c) contacting said solids-free stream with water and cooling said stream, and producing cooled synthesis gas and a solution containing $NH_3$ and dissolved $CO_2$;

(d) stripping said solution containing ammonia and $CO_2$ to produce a stripped aqueous solution containing a reduced concentration of ammonia and $CO_2$;

(e) utilizing the stripped aqueous solution from step (d) as at least part of the aqueous scrubbing solution of step (a).

In another embodiment, the invention relates to a process in which a gas stream containing flyslag, $CO_2$ and minor amounts of $NH_3$ and HCN, derived from the gasification of coal, is treated by (a) passing said gas stream to a solids separation zone, and separating the bulk of the flyslag in said zone, producing solid particulate flyslag and a synthesis gas stream having reduced flyslag content;

(b) passing said synthesis gas stream to a scrubbing zone and scrubbing said gas stream with an effective amount of an aqueous scrubbing solution and removing remaining flyslag particles from said stream, producing a substantially solids-free synthesis gas stream containing HCN, $NH_3$ and $CO_2$;

(c) removing HCN (and possibly COS) from said solids-free synthesis gas stream;

(d) contacting said solids-free stream with water and cooling said stream, and producing cooled synthesis gas and a solution containing $NH_3$ and dissolved $CO_2$;

(e) stripping said solution containing $NH_3$ and $CO_2$ to produce a stripped aqueous solution containing a reduced concentration of $NH_3$ and $CO_2$;

(f) utilizing the stripped aqueous solution from step (e) as at least part of the aqueous scrubbing solution of step (a).

In yet another embodiment, the invention relates to a process for the gasification of coal comprising (a) partially combusting particulate coal in a gasification zone, and producing a hot gaseous stream containing synthesis gas, flyslag, $CO_2$ and minor amounts of HCN, and $NH_3$;

(b) quenching and cooling said hot gaseous stream, and removing at least the bulk of the flyslag therefrom, producing a cool gaseous stream and having reduced flyslag content;

(c) passing said cool gaseous stream to an aqueous scrubbing zone and scrubbing said gas stream with an effective amount of an aqueous scrubbing solution and removing residual flyslag particles from said stream, producing a substantially solids-free synthesis gas stream;

(d) removing HCN (and possibly COS) from said solids-free synthesis gas stream;

(e) contacting said solids-free stream with water and cooling said stream, and producing cooled synthesis gas and a solution containing $NH_3$ and dissolved $CO_2$;

(f) stripping said solution containing ammonia and $CO_2$ to produce a stripped aqueous solution containing a reduced concentration of ammonia and $CO_2$;

(g) utilizing the stripped aqueous solution from step (f) as at least part of the aqueous scrubbing solution of step (a).

DETAILED DESCRIPTION OF THE INVENTION

The partial combustion of coal to produce synthesis gas, which is essentially carbon monoxide and hydrogen, and particulate flyslag, is well known, and a survey of known processes is given in "Ullmanns Enzyklopadie Der Technischen Chemie", vol. 10 (1958), pp. 360-458. Several such processes for the preparation of hydrogen and carbon monoxide, flyslag-containing gases are currently being developed. Accordingly, details of the gasification process are related only insofar as is necessary for understanding of the present invention.

In general, the gasification is carried out by partially combusting the coal with a limited volume of oxygen at a temperature normally between 800° C. and 2000° C., and preferably at a temperature between 1050° C. and 2000° C. If a temperature of between 1050° C. and 2000° C. is employed, the product gas may contain only very small amounts of gaseous side products such as ammonia, hydrogen cyanide, tars, phenols and condensable hydrocarbons. Suitable coals include lignite, bituminous coal, sub-bituminous coal, anthracite coal, and brown coal. Lignites and bituminous coals are preferred. In order to achieve a more rapid and complete gasification, initial pulverization of the coal is preferred. Particle size is preferably selected so that 70% of the solid coal feed can pass a 200 mesh sieve. The gasification is preferably carried out in the presence of oxygen and steam, the purity of the oxygen preferably being at least 90% by volume, nitrogen, carbon dioxide and argon being permissible as impurities. If the water content of the coal is too high, the coal should be dried before use. The atmosphere will be maintained reducing by the regulation of the weight ratio of the oxygen to moisture and ash free coal in the range of 0.6 to 1.0, preferably 0.8 to 0.9. The specific details of the equipment and procedures employed form no part of the invention, but those described in U.S. Pat. No. 4,350,103, and U.S. Pat. No. 4,350,103, and U.S. Pat. No. 4,458,607, both incorporated herein by reference, may be employed. Although, in general, it is preferred that the ratio between oxygen and steam be selected so that from 0.1 to 1.0 parts by volume of steam is present per part by volume of oxygen, the invention is applicable to processes having substantially different ratios of oxygen to steam. The oxygen used is preferably heated before being contacted with the coal, preferably to a temperature of from about 200° to 500° C.

The details of the gasification reactor system form no part of the present invention, and suitable reactors are described in British Patent No. 1501284 and U.S. Pat. No. 4,022,591. The high temperature at which the gasification is carried out is obtained by reacting the coal with oxygen and steam in a reactor at high velocity.

A preferred linear velocity is from 1 to 10 meters per second, although higher or lower velocities may be employed. The pressure at which the gasification can be effected may vary between wide limits, preferably being from 1 to 200 bar. Residence times may vary widely; common residence times of from 0.2 to 20 seconds are described, with residence times of from 0.5 to 15 seconds being preferred.

After the starting materials have been converted, the reaction product, which comprises hydrogen, carbon monoxide, carbon dioxide, and water, as well as the aforementioned impurities, is removed from the reactor. This gas, which normally has a temperature between 1050° C. and 1800° C., contains the impurities mentioned and flyslag, including carbon-containing solids. In order to permit removal of these materials and impurities from the gas, the reaction product stream should be first quenched and cooled. A variety of elaborate techniques have been developed for quenching and cooling the gaseous stream, the techniques in general being characterized by use of a quench gas and a boiler in which steam is generated with the aid of the waste heat. Cyclones or other suitable techniques may be provided for removing particulate solids from the gaseous stream. Even though such procedures may be practiced, further reduction of the solids content may nevertheless be desirable. To this end, the gas stream is passed through a scrubbing zone, where it is washed with an aqueous scrubbing solution. The scrubbing zone may comprise one or more scrubbing sections or "scrubbers". The term "aqueous scrubbing solution", as used herein, includes, but is not limited to, water which has been used to cool and remove ammonia from the synthesis gas, after stripping to remove $CO_2$, various process streams, and solution from which the HCN, $NH_3$ and COS have been stripped or removed by reaction, i.e., recycle scrubbing solution, as well as solution treated by hydrolysis, as further hereinafter described. The aqueous scrubbing solution may contain materials to assist in impurity removal, and caustic may be added to adjust pH and optimize removal. The aqueous scrubbing solution may also contain polysulfide, which reacts with the HCN in the gas stream to form thiocyanate. Depending on the type of scrubbing solution employed, different treatment of "spent" or "loaded" solution will be required. For example, if water (and recycle solution) is used as the aqueous scrubbing solution, the loaded solution may be forwarded to a stripping section where the HCN, $NH_3$, and $CO_2$ may be stripped and sent for disposal. If polysulfide is employed in the aqueous scrubbing solution, the spent thiocyanate containing solution may be sent to a hydrolysis zone where the thiocyanate is hydrolyzed to produce $NH_3$, $CO_2$, and $H_2S$. In this case the solution may then be stripped in a stripping section, and the released gases are processed as desired. Suitable hydrolysis techniques are described in U.S. Pat. No. 4,508,693, U.S. Pat. No. 4,497,784, and U.S. Pat. No. 4,505,881, all to Diaz, incorporated herein by reference. What is required in the invention, however, is that the scrubbing solution supplied to the residual solids removal scrubbing zone be stripped prior to use therein to remove $CO_2$ and avoid the potential for calcium carbonate buildup. As a result of such a washing treatment, a synthesis gas is obtained which contains hardly any solids.

As indicated, the invention involves the treatment of the ammoniacal and $CO_2$-containing wash solution. Accordingly, the aqueous wash solution containing dissolved $NH_3$ and $CO_2$ is fed to a stripping zone or stripper where the impurity gases are stripped from the solution. In the stripper, the wash solution may be stripped by heating, contact with a nonreactive gas, or a combination of heating and gas flow stripping. The stripping produces a gas stream containing $NH_3$, and $CO_2$, and a solution suitable for use in removing residual solids from the product synthesis gas. As indicated, the scrubbing solution from the residual solids removal zone contains particulate flyslag, these fine solids being present from infinitesimal amounts to amounts of from about 2% by weight to about 5% by weight. This content of fines determines the treatment of the solution described herein. Preferably, the bulk of the solution is returned, after stripping, to the scrubbing zone for reuse. Reagents may be added in the stripper to assist release of $NH_3$ and $CO_2$.

Whatever the case, as indicated, the scrubbing solution may be stripped by heating, or by use of flow of a non-reactive gas (or both). If heat alone is applied to the scrubbing solution, sufficient heat will be supplied to release the dissolved gases. Generally, temperatures on the order of about 80° C. to about 150° C., preferably from about 80° C. to about 120° C., will be sufficient to release the dissolved gases.

If a non-reactive stripping gas is employed, it will be supplied at a suitable pressure, for example 3 to 5 atmospheres, to strip the dissolved gases from the scrubbing solution. Any suitable stripping device may be used, such as packed column or a tray column. Different devices may be used (whether stripping is accomplished by heat, gas flow, or a combination thereof) where plugging by solids may be a problem. In any event, any suitable non-reactive gas may be employed. As used herein, the term "non-reactive" implies that the gas does not react with the scrubbing solution to any substantial extent. Suitable gases, under the conditions in the stripping zone, include air, steam, oxygen, nitrogen, and inert gases. Steam is much preferred, since it can provide heat for the stripping and may be condensed easily, leaving a relatively concentrated stream. Those skilled in the art may adjust volumes and velocities of the stripping gas to appropriate levels. As indicated, heat may be supplied in the case of a stripping gas to assist the stripping.

The stripped impurity gases are separated and removed from the scrubbing solution and, depending on their nature, for example, may be forwarded to a gasification reactor. If a multiplicity of gasification reactors is employed in the gasification zone, the impurity gases from the stripping zone may be sent to any one or all of the reactors, as desired or appropriate. If the gasification reactor is operated under high pressure, as is commonly the case, the pressure of the impurity gas stream must be increased for entry of the gases into the reactor. Suitable devices for doing so are within the skill of the art, and as such, form no part of the present invention. Alternately, the stripped gases may be sent for chemical treatment or recovery.

In order to illustrate the invention more fully, reference is made to the accompanying schematic drawing. The drawing is of the process flow type in which auxiliary equipment, such as valves, pumps, holding vessels, etc., have been omitted therefrom. All values are merely exemplary or calculated.

Accordingly, pulverized coal is passed via line (1) into a gasification reactor (2) where it is gasified at a temperature of about 1500° C. to about 2000° C., a pressure of about 35 atmospheres absolute, with oxygen, which is supplied through a line (3). The gasification produces a product or synthesis gas which is removed from the upper portion of the reactor via line (4), and a slag which is removed from the lower portion of the reactor via line (5). The gasification product is quenched in zone (6) and then passed through a boiler or heat exchange zone (7) where it is cooled to a temperature of about 200° C. The cooled gasification product is passed through a line (8) to a series of cyclones (9) where the bulk of the particulates (flyslag) is removed via line (10). The synthesis gas then passes via line (11) to a scrubber (preferably a venturi) (12) where it is contacted with an aqueous scrubbing solution. Water and/or recycle scrubbing water solution are supplied to scrubber (12) through line (13). Residual solids are removed from the synthesis gas by the scrubbing solution, and loaded solution is sent to a stripper (14) for removal of sour gases and return of solution. The synthesis gas, now free of solids, is sent to an HCN removal zone (15) wherein a scrubbing solution containing ammonium polysulfide converts and absorbs HCN in the gaseous stream. If COS is present in the stream, the polysulfide may be used for conversion thereof, or catalytic conversion as described in U.S. Pat. No. 4,810,475 may be employed. Synthesis gas passes from HCN removal zone (15) via line (16) to cooling and wash zone (17). In zone (17), the synthesis gas is cooled, preferably to about 40° C. to about 60° C., and washed to remove $NH_3$ $CO_2$ is also removed. Zone (17) also includes a separating section (17a) wherein the wash water, containing the dissolved gases, is removed and is sent by line (18) to a stripping zone (20). Stripping zone (20) comprises a stripper contactor of the tray type, in which liquid is introduced into the top of the column and a non-reactive gas is introduced via line (21) into the bottom of the column. Preferably, steam, at a temperature of 300° F., is employed in stripping the gases, so that upon leaving column (20), through line (22), the now freed impurity gases and the steam in line (22) are suitably conveyed for further treatment. Stripped solution is removed via line (13) and sent, with suitable addition, if necessary, for use in scrubber (12).

While the invention has been illustrated with particular apparatus, those skilled in the art will appreciate that, except where specified other equivalent or analogous units may be employed. The term "zone", as employed in the specification and claims, includes, where suitable, the use of segmented equipment operated in series, or the division of one unit into multiple units to improve efficiency or overcome size constraints, etc. For example, a series of scrubbers might be employed, with different aqueous solutions, at least the bulk of the "loaded" solutions being sent to one or more strippers. Parallel operation of units, is, of course, well within the scope of the invention.

What is claimed is:

1. A process for the purification of a synthesis gas stream containing $CO_2$ and minor amounts of $NH_3$ and HCN, and from which the bulk of the flyslag has been removed but which contains residual flyslag particles, comprising (a) passing said synthesis gas stream to a solids scrubbing zone and scrubbing said gas stream with an effective amount of an aqueous scrubbing solution and removing residual flyslag particles from said stream, producing a substantially solids-free synthesis gas stream containing HCN, $CO_2$ and $NH_3$ and possibly COS;

(b) removing HCN, and possibly COS, from said solids-free synthesis gas stream;

(c) contacting said solids-free stream with water and cooling said stream, and producing cooled synthesis gas and a solution containing $NH_3$ and dissolved $CO_2$;

(d) stripping said solution containing ammonia and $CO_2$ to produce a stripped aqueous solution containing a reduced concentration of ammonia and $CO_2$;

(e) utilizing the stripped aqueous solution from step (d) as at least part of the aqueous scrubbing solution of step (a).

2. A process for the removal of flyslag from a gas stream containing flyslag and $CO_2$, the gas stream derived from the gasification of coal, comprising (a) passing said gas stream containing flyslag to a solids separation zone, and separating the bulk of the flyslag in said zone, producing solid flyslag and a gas stream having reduced flyslag content;

(b) passing gas stream having reduced flyslag content from step (a) to a scrubbing zone and scrubbing said gas stream with an effective amount of an aqueous scrubbing solution and removing remaining flyslag particles from said stream, producing a substantially solids-free $CO_2$-containing synthesis gas stream;

(c) removing HCn from said solids-free $CO_2$-containing synthesis gas stream;

(d) contacting said solids-free $CO_2$-containing stream with water and cooling said stream, and producing cooled synthesis gas and a solution containing $NH_3$ and dissolved $CO_2$;

(e) stripping said solution containing ammonia and $CO_2$ to produce a stripped aqueous solution containing a reduced concentration of ammonia and $CO_2$;

(f) utilizing the stripping aqueous solution from step (e) as at least part of the aqueous scrubbing solution of step (b).

3. A process for the gasification of coal comprising (a) partially combusting particulate coal in a gasification zone comprising at least one gasification reactor, and producing a hot gaseous stream containing synthesis gas, flyslag, and minor amounts of HCN, $NH_3$, and $CO_2$;

(b) quenching and hot cooling said gaseous stream, and removing at least the bulk of the flyslag therefrom, producing a cooled gaseous stream having reduced flyslag content;

(c) passing gas stream having reduced flyslag content from step (b) to a scrubbing zone and scrubbing said gas stream with an effective amount of an aqueous scrubbing solution and removing remaining flyslag particles from said stream, producing a substantially solids-free $CO_2$-containing synthesis gas stream;

(d) removing HCN from said solids-free $CO_2$-containing synthesis gas stream;

(e) contacting said solids-free $CO_2$-containing stream with water and cooling said stream, and producing cooled synthesis gas and a solution containing $NH_3$ and dissolved $CO_2$;

(f) stripping said solution containing ammonia and $CO_2$ to produce a stripped aqueous solution containing a reduced concentration of ammonia and $CO_2$;

(g) utilizing the stripped aqueous solution from step (f) as at least part of the aqueous scrubbing solution of step (c).

* * * * *